J. B. WIARD.
DYNAMO ELECTRIC MACHINE.
APPLICATION FILED OCT. 3, 1919.
1,360,483.
Patented Nov. 30, 1920.
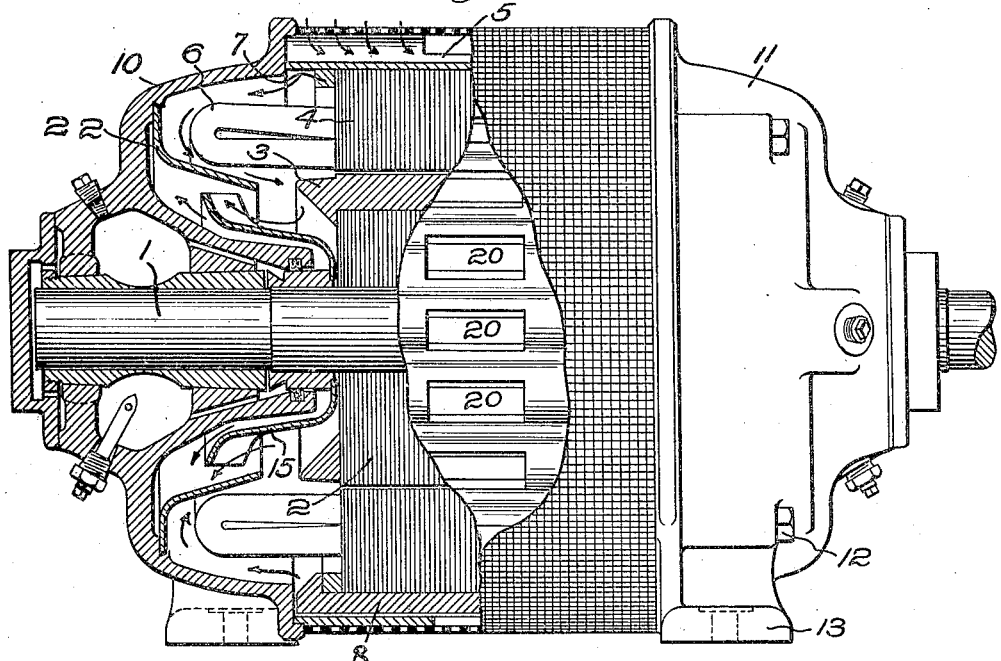
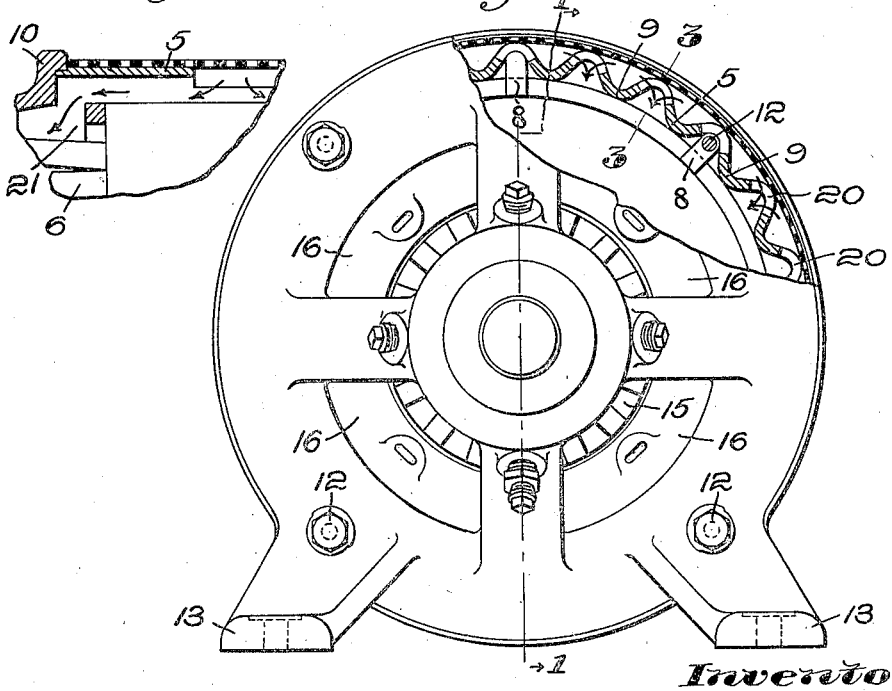
Inventor:
John B. Wiard

UNITED STATES PATENT OFFICE.

JOHN B. WIARD, OF LYNN, MASSACHUSETTS.

DYNAMO-ELECTRIC MACHINE.

1,360,483. Specification of Letters Patent. Patented Nov. 30, 1920.

Application filed October 3, 1919. Serial No. 328,287.

*To all whom it may concern:*

Be it known that I, JOHN B. WIARD, a citizen of the United States, and a resident of Lynn, in the county of Essex and State of Massachusetts, have invented an Improvement in Dynamo-Electric Machines, of which the following description, in connection with the accompanying drawings, is a specification, like characters on the drawings representing like parts.

This invention relates to dynamo electric machines and more particularly to provisions for dissipating the heat in such machines by the introduction of cooling air.

The invention will be best understood by reference to the following description when taken in connection with the accompanying illustration, while its scope will be more particularly pointed out in the appended claims.

In the drawings:—

Figure 1 is a side elevation, partially in section, showing a motor embodying one form of the invention, the section being taken on the line 1—1 in Fig. 2;

Fig. 2 is an end elevation, also partly in section, of the motor shown in Fig. 1; and Fig. 3 is a detail in section taken on the line 3—3 in Fig. 2.

Referring to the drawings and to the embodiment of the invention which is shown for illustrative purposes, I have there disclosed an induction motor, although the improvements herein referred to may be usefully employed in motors of other types, both alternating and direct current, and in generators as well as motors. The motor herein shown is provided with the rotor 2 having the shaft 1 and the squirrel cage winding 3. This is mounted to rotate within a stator which, as usual, is of laminated iron construction formed of a plurality of annular sheet metal plates 4 held together within a casing 5 and provided with the usual windings 6. In the illustrated embodiment of the invention means are provided for admitting cooling air through the casing in such a path that it travels first in contact with the exterior of the casing and then in the opposite direction in contact with the interior of the casing and the outer surface of the stator core, the cooling air dividing within the casing and thence passing to opposite ends of the motor where it is circulated in two symmetrical paths around about the stator windings, thence inwardly about the rotor parts, being discharged at opposite ends of the motor through the end shields.

The provision of air-cooling passages qualified to carry out the purposes of this invention may be had in motor constructions or motor casings widely differing from that herein shown; but to facilitate construction and as a convenient means for providing such passages the casing 5 is constructed of sheet metal or other suitable material, of appropriate thickness, and is provided with longitudinal corrugations as indicated in the drawings. The stator core 4 is first assembled and the punchings are tightly pressed together under heavy pressure in a suitable jig. A ring 7 of suitable stiffness and of substantially the same external diameter as that of the stator core is then applied to each outside face of the assembled core while the structure is still under pressure; and one or more (herein eight) clamping devices which are herein shown in the form of rigid U-shaped clamps 8 are forced into position so as to straddle the periphery of the core and firmly clamp the latter together by the gripping pressure of their legs which bear against the ring 7.

While the pressure within the stator core is thus maintained by means of the clamps above referred to, the casing 5 is forced on the outside periphery of the core. The construction of the casing is such that it has a measure of flexibility, that is to say, it is capable of expanding slightly and symmetrically. Its free internal diameter being slightly less than that of the exterior part of the core, when the latter is forced into the casing the casing will expand slightly and symmetrically, firmly gripping the core at the detached points of gripping contact presented by the corrugations at 9, etc.

The structure may then be removed from the jig and mounted on an expanding arbor and the side and peripheral edges of the casing machined so as to receive the end shields 10 and 11. By suitably proportioning the internal free diameter of the corrugated holder and the thickness and size or shape of the corrugations, the latter will be given an inherent flexibility which will grip the stator core with any desired pressure so that it will hold the core in place and against angular displacement. In order to secure the end shields to the casing, the ends of several of the clamps 8 are threaded to receive cap screw bolts 12, the latter passing through the end shield casings and serving to clamp the end shields to the core structure. Four such clamp screws are shown on each end shield, although any desired number may be employed.

While suitable supports may be attached to the casing if desired, herein supporting feet 13 are shown as secured to or formed integrally with the end shields. The latter may be assembled in any one of several different positions by removing the cap screws and turning the end shields about the stator so that the terminal leads can project at different points relative to the position assumed by the feet and convenient for wiring in any particular installation.

In order to dissipate heat by the circulation of cooling air, means are provided for forcing air into contact with the heated parts of the motor and suitable conduits or passages are provided for insuring an effective circulation of such air. While any suitable means may be employed for maintaining an air circulation, herein a ventilating fan 15 (one of which is shown in Fig. 1) is secured at each end of the rotor core 2 and serves to maintain a circulation of the cooling air which is conducted through the casing in two symmetrical paths and expel the same through the openings 16 in the end shields. The fan may be of any suitable construction but herein it is similar to the fan shown in my co-pending application, Ser. No. 323,854, filed Sept. 15, 1919, comprising a bell-shaped body with a flaring and fluted end flange so as to form what are, in effect, vanes or blades between which there are interior and exterior air-conducting channels. This shape of fan provides not only for the expulsion of the interior current of air in the direction indicated by the arrows in Fig. 1, but also for an exterior current which is set into movement by the exterior channels, such exterior current of air being drawn inwardly from the end of the shaft close to the bearings and the fan, whence it is deflected radially outward as indicated in Fig. 1.

Referring to the conduits or passages for the cooling air, the air is admitted intermediate the ends of the casing, herein by providing central air-admission openings 20 which are formed by cutting through the outwardly projecting ribs or corrugations presented by the casing. Cooling air entering such admission openings enters the interior longitudinal conduits or passages formed by such corrugations between the casing and the stator core. The entering cooling air divides into two symmetrical streams, as indicated in Fig. 3, and passes to opposite ends of the casing. At the end of the casing each current of air is caused to pass through the annular opening 21 provided between the end ring 7 and the adjoining end shield, thence passing (as shown by the direction of the arrows in Figs. 1 and 3) over and about the stator coils 6 and thence, through the interposition of the deflector shield 22, inwardly into proximity with the end of the rotor windings, whence it is expelled through the annular space between the inner edge of the deflector and the fan 15 by the force of suction maintained by the fan.

The corrugations in the casing not only provide interior longitudinal conduits, along which the centrally admitted cooling air must travel in proximity to the stator core and the casing before reaching the end of the casing and the vicinity of the stator coils, but they also provide exterior longitudinal conduits along which the air may be made to circulate in contact with the outside of the casing before being admitted to the interior thereof. To this end any suitable means may be employed for deflecting the incoming air along the corrugations of the casing, but herein the casing is covered by a screen which may be of any suitable size or shape but herein encircles the entire casing from end to end. This not only screens the entering air but causes a large portion of the air passing through the admission openings 20 to be drawn through the end of the screen and passed along the external corrugations from opposite ends of the casing to the central portion thereof. This is due to the fact that the full supply of air required for the admission openings cannot be drawn through that portion of the screen in immediate proximity thereto but must be drawn from the ends thereof as well. The amount of air which is drawn through the ends of the screen will increase as the motor is used and the portion of the screen immediately contiguous to the central openings becomes more or less clogged with dust or lint.

The described construction therefore presents air passages which cause the incoming cooling air to flow in contact with the outside of the casing from opposite ends thereof toward an intermediate point and thence, in proximity to or contact with the interior of the casing and the stator core, from the intermediate point toward opposite ends thereof, the flow of the air within the casing being in two symmetrical streams, and being thereby brought into contact with or in proximity to the stator windings and the rotor windings and expelled through opposite ends of the motor.

The two currents of air being substantially symmetrical, the opposite ends of the motor are subjected to the same, uniform cooling effect. The cooling air circulating over both the outside and inside of the casing, a highly effective dissipation of the heat is secured. It will also be observed that the cool incoming air is first brought in contact with the casing and stator parts the temperature of which in a motor of the disclosed type is apt to be the highest, so that the heat losses are most effectively taken care of by this method. It will also be observed that the shape of the casing and the provision of the longitudinal conduits exposes a large area of the casing for the dissipation of heat losses.

I do not herein claim the feature of cooling the motor with currents of air which are directed first upon the stator parts and then upon the rotor parts, such feature forming the subject matter of my copending application Serial No. 323,854, filed Sept. 15, 1919.

While I have herein shown and described for purposes of illustration one specific embodiment of the invention, it will be understood that the same is not limited to the details of construction or the form or shape or relation of the parts herein described, but that extensive deviations may be made therein without departing from the spirit of the invention.

Claims:

1. A dynamo electric machine having a stator, a rotor, a corrugated casing having longitudinal corrugations and presenting external and internal longitudinal air conducting passages, a casing inclosing said corrugated casing and presenting screened air inlet openings, said corrugated casing having air inlet openings arranged centrally intermediate its ends to conduct the air passing along the external corrugations or passages from opposite ends toward the center thereof into the interior of the casing, means for directing the air from said passages to the working space of the motor and in proximity to the stator windings and rotor parts, and means for expelling the air from opposite ends of the motor thereby to maintain symmetrical air currents at opposite ends thereof.

2. A dynamo electric machine having a corrugated casing with air inlet openings arranged intermediate the ends, a screen to cover the corrugations and permitting screened air to enter said inlet openings, said motor presenting air passages between the casing and the stator core to conduct said air to opposite ends of the motor casing, and means for forcing the air from opposite ends of the motor.

3. A dynamo electric machine having a casing with air circulating means and presenting air passages with walls arranged to direct the travel of the cooling air first in contact with the exterior of the casing in one direction and thence to direct its travel in contact with the interior of the casing in the opposite direction.

4. A dynamo electric machine having a casing, a laminated stator core and air-circulating means, said machine presenting air-conducting passages adapted to restrict the admission of air to the central part of the casing and to conduct it thence laterally and outside the laminated core to opposite ends of the casing, and thence to the working space of the machine to bring the air in contact with the stator and rotor parts.

5. A dynamo electric machine having a casing, a laminated core, bearings and air circulating means and presenting air-conducting passages adapted to admit the air through the casing but restricting its admission to the central part thereof, and thence to conduct it over the peripheral edges of the core to the working space of the machine, said passages further directing the discharge of the air through the end of the machine adjacent its bearings.

6. A dynamo electric machine having a stator core and a corrugated casing and air-circulating means, said machine presenting air conducting passages providing for the admission of the air through openings intermediate the ends of the casing and its passage to opposite ends of the casing in proximity to the interior of the casing and the stator core.

7. A dynamo electric machine having a casing with an admission opening and air circulating means and having also air conduits providing for the passage of the air in contact with the exterior of the casing before entering the same then in contact with the interior thereof and then in contact with the stator and rotor parts.

8. A dynamo electric machine having a casing with an air admission opening and air circulating means, a stator having its core in peripheral contact with the walls of the casing, and air conduits providing for the passage of the air longitudinally in contact with the exterior of the casing before entering the same.

9. A dynamo electric machine having a casing, air circulating means and presenting external and internal air passages with the walls arranged longitudinally the axis of the machine adapted to conduct the air longitudinally in contact with the exterior of the casing before entering the same and thence longitudinally in contact with the interior thereof after entering the same.

10. A dynamo electric machine having a casing, air circulating means, a stator having its core in contact with the casing, the latter presenting air passages adapted to conduct the air in contact with the exterior of the casing before entering the same and thence longitudinally in contact with the interior thereof and with the stator core after entering the same.

11. A dynamo electric machine having a casing and air circulating means, said machine presenting air passages adapted to conduct the air longitudinally in contact with the exterior of the casing from the ends thereof toward an intermediate opening and thence in opposite directions in contact with the interior of the casing after entering the same.

12. A dynamo electric machine having a stator core and a casing, air circulating means, said machine presenting longitudinal air conducting passages exterior of the casing and longitudinal air conducting passages within the casing and between the latter and the stator core, the exterior passages communicating with the interior passages.

13. A dynamo electric machine having a casing with external air conducting grooves longitudinally arranged and air circulating means, said casing having air admission openings intermediate its ends and having also means external to the casing to assist in directing the air along the grooves.

14. A dynamo electric machine having a casing with external air conducting grooves longitudinally arranged and air circulating means, a screen overlying said casing to form screened air admission openings intermediate its ends, and means for conducting air from said grooves to the interior of the casing.

15. The method of cooling a dynamo electric machine which consists in forcing air through the casing of said machine and first causing said air to travel in contact with the exterior surface of said casing, next interiorly in contact with the stator parts and thereafter in contact with the rotor parts.

16. A dynamo electric machine having a stator and a rotor, a casing providing external and internal air cooling passages longitudinally of the machine, the internal passages having exit openings communicating with the working space of the motor, the external passages having air admission openings adjacent the ends and the external passages having exit openings to the internal passages at points intermediate the ends.

17. A dynamo electric machine having a stator and a rotor, a casing the walls of which form external and internal air cooling passages, the external passages having air admission openings and having also exit openings to the internal passages, the internal passages being formed in part by the walls of the stator, whereby the cooling air contacts directly therewith, and the internal passages communicating with the working space of the machine, whereby the air entering the external passages is delivered to the internal passages and thence to the working space, and means for discharging the air from the casing.

18. A dynamo electric machine having a stator and a rotor, a casing providing external and internal air cooling passages longitudinally of the machine, the internal passages having exit openings communicating with the working space of the motor at opposite ends thereof and the external passages having air admission openings adjacent the ends and the external passages having exit openings to the internal passages at points intermediate the ends, combined with air discharge openings at opposite ends, and air pressure creating means to create symmetrical cooling currents at opposite ends of the machine.

19. A dynamo electric machine having a stator core, a casing with which the core has contact at separated points, there being provided between the points of contact longitudinal air cooling passages communicating at opposite ends with the working space of the motor, external air communicating passages provided by said casing having openings communicating with the internal passages, and means for creating air cooling currents passing along said external passages, thence to said internal passages and thence to the working space of the motor.

20. In a dynamo electric machine the combination with a stator core of a sheet metal casing, the latter having contact with the core at a plurality of separated points, and air-circulating devices, said machine presenting air passages located to circulate externally derived air over both sides of the sheet metal casing.

21. In a dynamo electric machine the combination with a stator and its core of an externally grooved casing having contact with the core at a plurality of separated points and a screen element overlying an external portion of the casing and in contact therewith.

22. In a dynamo electric machine the combination with a stator core of a sheet metal casing, the latter having contact with the core at a plurality of separated points and air-circulating devices, said machine presenting air passages located to circulate externally derived air first across the outside of the casing and then on the inside thereof in contact with the periphery of the core and then to and through the working space of the motor.

23. In a dynamo electric machine the combination with a laminated stator core of a sheet metal casing, the latter having contact with the core at a plurality of separated points and presenting a longitudinal passage extending across the peripheral edges of the core lengthwise the axis of the machine and air-circulating devices with means to direct externally derived air first over the outside of the casing and then on the inside thereof through said longitudinal passage.

24. A dynamo electric machine having a stator core, a corrugated casing having contact with the core at a plurality of separated points and air-circulating means, said machine presenting air-conducting passages lengthwise the machine between the casing and the core and adapted to bring external cooling air in contact with the periphery of the core.

In testimony whereof I have signed my name to this specification.

JOHN B. WIARD.